United States Patent [19]

Shinohara

[11] Patent Number: 5,483,395
[45] Date of Patent: Jan. 9, 1996

[54] TAPE RECORDER FOR USE WITH ANALOG COMPACT CASSETTES AND DIGITAL TAPE CASSETTES

[75] Inventor: Isao Shinohara, Ikoma, Japan

[73] Assignee: Matsushita Electric Industrial Co., Ltd., Osaka, Japan

[21] Appl. No.: 231,584

[22] Filed: Apr. 20, 1994

Related U.S. Application Data

[63] Continuation of Ser. No. 828,424, Jan. 31, 1992, abandoned.

[30] Foreign Application Priority Data

Feb. 5, 1991 [JP] Japan .................................. 3-014263

[51] Int. Cl.⁶ .............................. G11B 5/78; G11B 5/74
[52] U.S. Cl. .............................. 360/96.5; 360/94
[58] Field of Search ........................ 360/93, 94, 96.5, 360/96.6; 369/77.2; 242/338.4

[56] References Cited

U.S. PATENT DOCUMENTS

| | | | |
|---|---|---|---|
| 4,097,006 | 6/1978 | Saito | 242/199 |
| 4,607,303 | 8/1986 | Cybulski | 360/96.5 |
| 4,618,903 | 10/1986 | Oishi et al. | 360/93 |
| 4,620,254 | 10/1986 | Smith, II | 360/93 |
| 4,688,206 | 8/1987 | Nakagawa et al. | 360/133 |
| 4,792,872 | 12/1988 | Nakanishi et al. | 360/96.5 |
| 4,812,931 | 3/1989 | Shibaike | 360/96.6 |
| 4,827,363 | 5/1989 | Takashima et al. | 360/96.3 |
| 4,918,552 | 4/1990 | Tsutsumi et al. | 360/96.5 |
| 5,161,079 | 11/1997 | Ohshima et al. | 360/132 |
| 5,365,393 | 11/1994 | Weber et al. | 360/132 |

FOREIGN PATENT DOCUMENTS

| | | |
|---|---|---|
| 0406943 | 1/1991 | European Pat. Off. . |
| 0438144 | 7/1991 | European Pat. Off. . |
| 1010456 | 1/1989 | Japan . |

*Primary Examiner*—Robert S. Tupper
*Assistant Examiner*—David D. Davis
*Attorney, Agent, or Firm*—Ratner & Prestia

[57] ABSTRACT

A tape recorder includes a first position where an analog compact cassette and a digital tape cassette are installed and dismounted, and a second position where a magnetic tape is caused to run. The digital tape cassette has a shutter for covering front openings for inserting a magnetic head and pinch rollers when the cassette is not used and opened in the magnetic tape running direction or the opposite when the cassette is used. The digital tape cassette also includes a holder for allowing either cassette to reciprocate between the first position and the second position, and a shutter operating device for opening and closing the shutter. The holder is integrated with the shutter operating device.

2 Claims, 5 Drawing Sheets

TAPE RECORDER FOR USE WITH ANALOG COMPACT CASSETTES AND DIGITAL TAPE CASSETTES

This application is a continuation of application Ser. No. 07/828,424 filed Jan. 31, 1992, now abandoned.

BACKGROUND OF THE INVENTION

1. Field of the Invention

The present invention relates to a tape recorder, and more particularly to a tape recorder for allowing the use of two types of tape cassettes, one having front windows being closable with a shutter when the cassette is not used and openable when used, and the other type having a thick portion in the front openings for allowing a magnetic head, pinch rollers and the like to be inserted.

2. Description of the Prior Art

In recent years audio appliances have been digitized. High fidelity tape recorders are becoming popular which are digital recording and digital playback systems, and which include either an R-DAT system utilizing a rotatable head or an S-DAT system utilizing a fixed head are known. The S-DAT system is especially popular because of the similar structures of the head and the tape cassette with those of an analog tape recorder currently in wide use. There is a demand for a tape recorder which can record and reproduce both digital and analog signals.

The proposed tape recorder with the analog and digital feasibilities mentioned above allows two types of tape cassettes to be installed, wherein the two types are an analog compact cassette (hereinafter called the ACC) having a thick portion in the front openings for allowing a magnetic head, pinch rollers and the like to be inserted, and a digital compact cassette (hereinafter called the DCC) with a shutter, having front openings for allowing a magnetic head, pinch rollers and the like to be inserted, the openings being closable when the cassette is not used, and openable when used. This type of tape recorder can be applied both to the DCC with a shutter and to the conventional ACC.

However, this type of the tape recorder has difficulty in opening the shutter when the DCC is installed thereon.

SUMMARY OF THE INVENTION

The tape recorder of this invention, which overcomes the above-discussed and numerous other disadvantages and deficiencies of the prior art, comprises a first position where an analog compact cassette or a digital tape cassette are installed and dismounted, and a second position where a magnetic tape is caused to run, wherein the digital tape cassette has a shutter for covering front openings for inserting a magnetic head and pinch rollers when the cassette is not used and opened in the magnetic tape play or rewind directions when the cassette is used, and a holding means for allowing either type of cassette to reciprocate between the first position and the second position, and a shutter operating means for opening and closing the shutter of the digital type of cassette, wherein the holding means is integrated with the shutter operating means.

In a preferred embodiment, the shutter operating means comprises an arm member having a pivotal point at a position opposite to the sliding direction of the shutter.

In a preferred embodiment, the arm member rotates beyond a position where the shutter of the cassette is opened at a cassette installing position up to a position forward of the front surface of the tape cassette installed on the holder.

In a preferred embodiment, the arm member comprises an engager having a thicker portion than one type of tape cassettes at least in a position where a magnetic head, pinch rollers and the like are inserted, the thicker portion having a thickness sufficient to enable the engager to be engageable with the front part of the other type of cassette.

Alternatively, the tape recorder is applicable to an analog type compact cassette and a digital type tape cassette with a shutter, and comprises a cassette pressing member for pressing the tape cassettes toward a magnetic head thereof, an obstructive member for preventing the tape cassette from moving toward the magnetic head by the cassette pressing means so as to exactly locate the tape cassette at an installing position, the cassette pressing member having a reverse V-shaped elastic part with its one end fixed on a lower base plate and the other end being displaceable, a first pressing portion for pressing one side of a positioning hole of the digital type tape cassette, and opening the shutter in a magnetic tape running direction or in the opposite direction when the cassette is used, and a second pressing portion for pressing one side of a positioning hole of the analog type tape cassette having a thicker portion including front openings for inserting a magnetic head, pinch rollers and the like than that of the digital type tape cassette.

Thus, the invention described herein makes possible the objective of providing a tape recorder applicable to both the ACC and the DCC equipped with a shutter which is easily opened when the DCC is installed.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
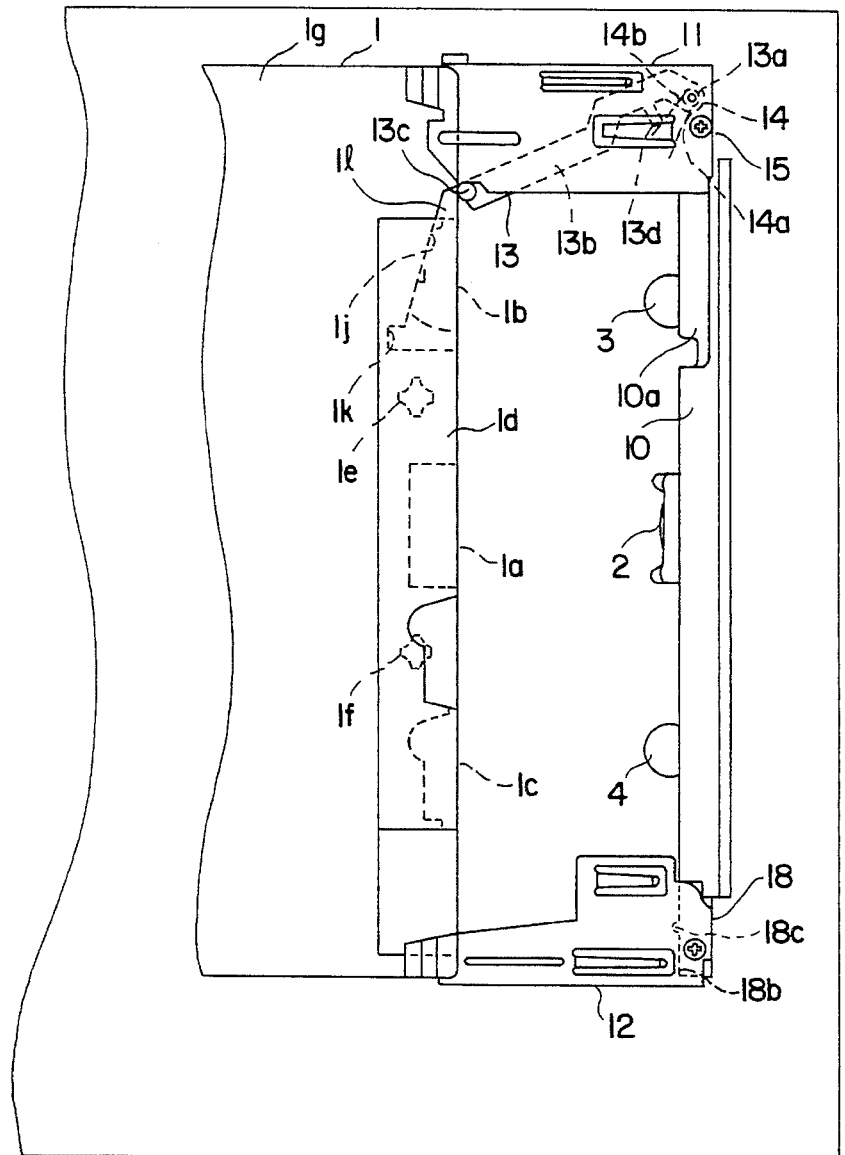
FIG. 1 is a plan view of a main portion of a tape recorder according to the present invention before installing a DCC.
Figure 2:
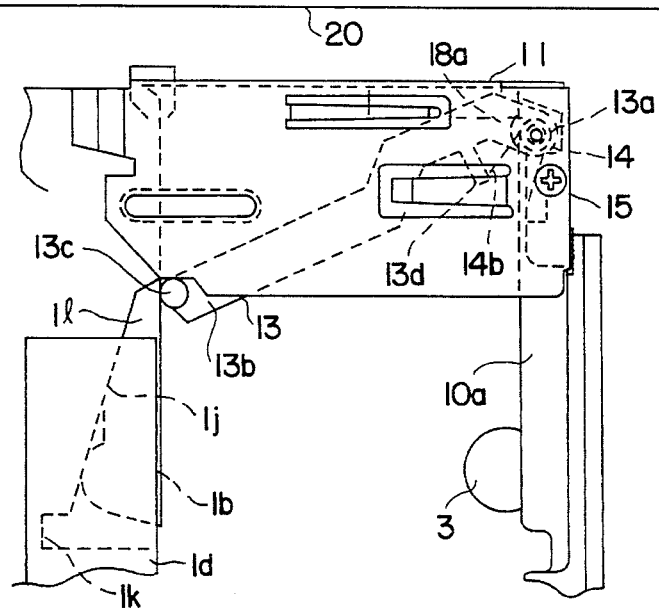
FIG. 2 is a fragmentary view on an enlarged scale showing the tape recorder of FIG. 1.
Figure 8A:
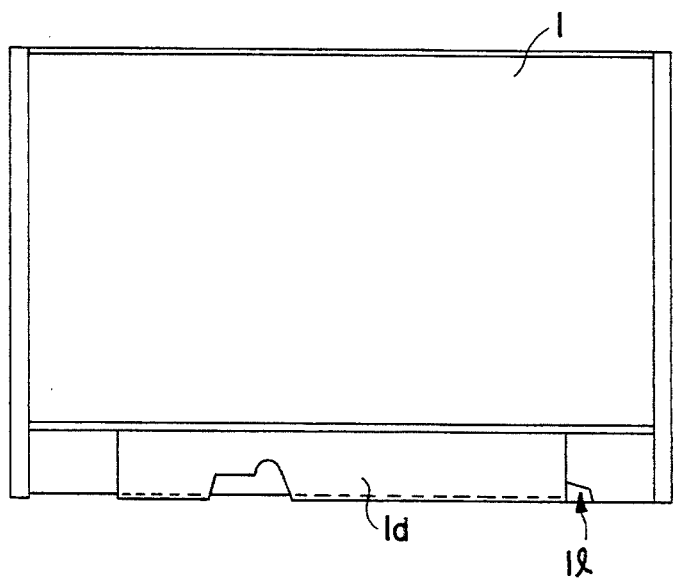
FIG. 8A is a plan view of the DCC closed with its shutter.
Figure 8B:
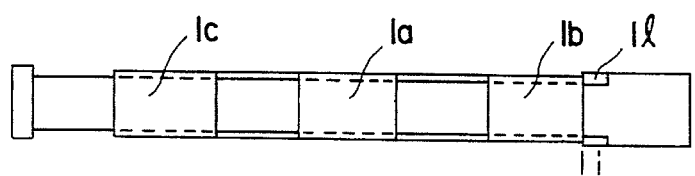
FIG. 8B is a front view showing the DDC of FIG. 8A.
Figure 8C:
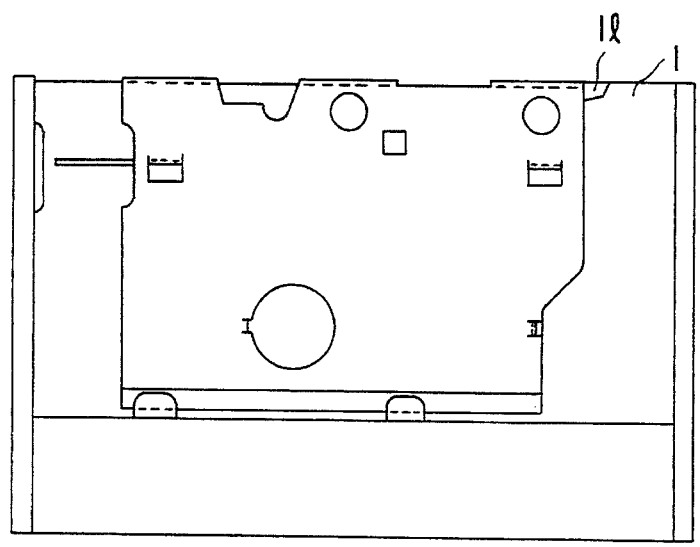
FIG. 8C is a bottom plan showing the DDC of FIG. 8A.
Figure 9A:
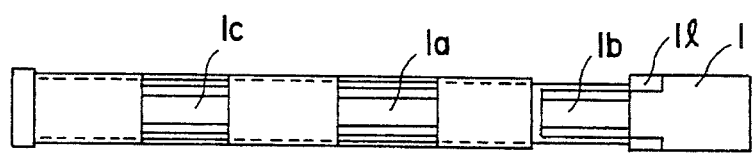
FIG. 9A is a front view of the DCC having its shutter opened.
Figure 9B:
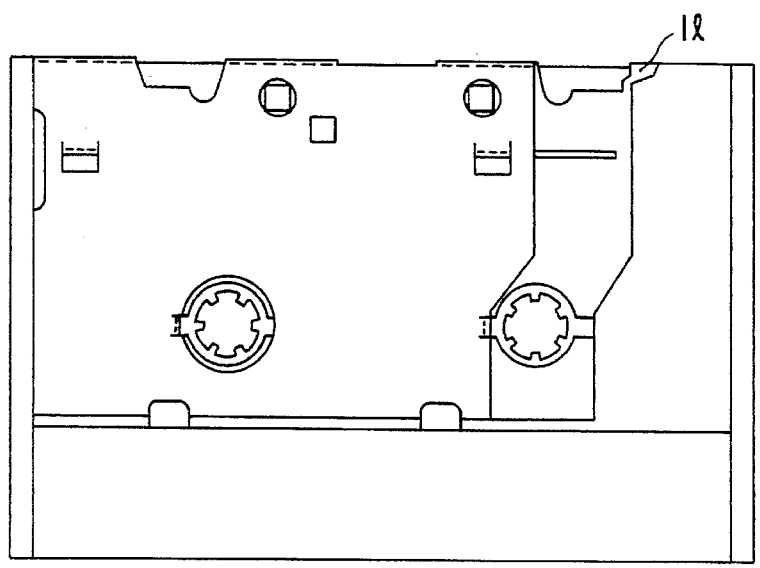
FIG. 9B is a plan view of the DDC of FIG. 9A.

In FIGS. 1 and 2, the reference numeral 1 denotes a DCC equipped with a shutter, the DCC being of about the same size as an ACC. The DCC may be situated within tape recorder 20. The DCC includes windows 1a, 1b and 1c in the front surface for inserting a magnetic head 2, and a first and a second pinch rollers 3 and 4, respectively, closable by a shutter 1d as shown in FIG. 8A when the DCC is not used. When the DCC is used, the shutter 1d is slid in a tape play direction or a tape rewind direction so as to open the windows 1a, 1b and 1c. The DCC 1 also includes a guide portion 1j, a lock portion 1k and a notch 1l. A first and a second positioning hole 1e and 1f provided on the back side of the DCC 1 are also openable when the shutter 1d is slid.

Figure 5:
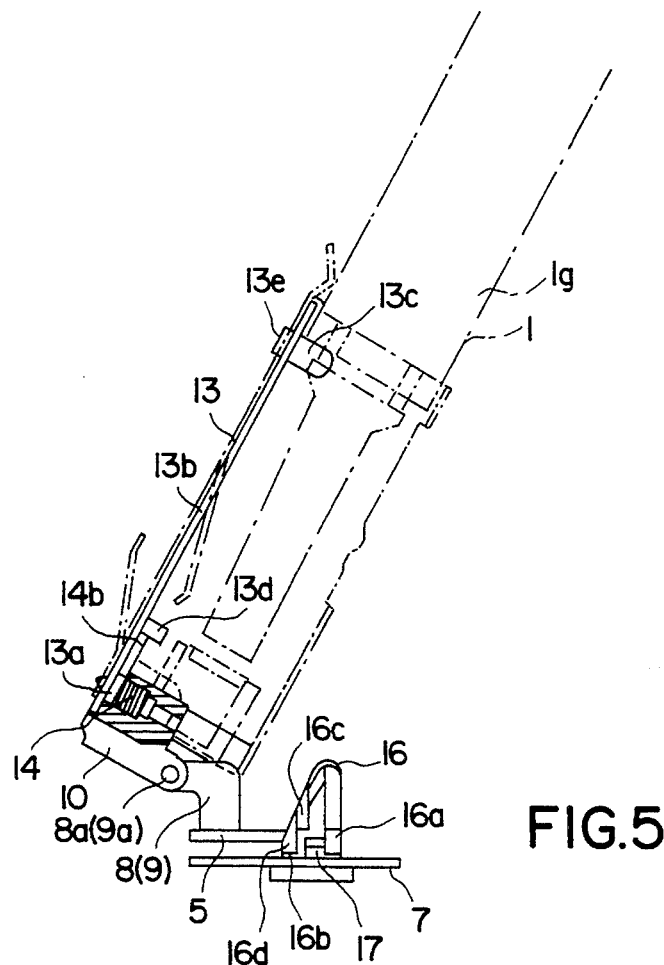
FIG. 5 is a side view showing a positional relationship between a DCC and a cassette pressing hook when the DDC is placed at the removing position.

As shown in FIG. 5 the reference numeral 5 denotes an upper base plate disposed along a tape housing 1g of the DCC or a tape housing 6a of the ACC, which has a thicker portion than the DCC for inserting the magnetic head 2, the first and second pinch rollers 3 and 4. The housings 1g and 6a accommodate rolls of the magnetic tapes of the DCC and ACC, respectively. A notch (not shown) is formed on an inlet portion 6b which is thicker than the housing 6a.

The reference numeral 7 denotes a lower base plate provided along the inlet portion 6b fixed on the upper base plate 5 by screws (not shown) with a space therebetween. The reference numerals 8 and 9 denote a first and second cassette holder supports fixed on the upper base plate 5, which support a holder 10 rotatably on their axes 8a and 9a as shown in FIG. 5. The holder 10 is fixed at both ends by screws (not shown), and includes a first and second cassette holders 11 and 12 for accommodating tape cassettes.

The first and second pinch rollers 3 and 4 are carried on the axes of a first and second pinch roller arms (not shown) upright on the holder 10. These pinch rollers 3 and 4 are loaded in clockwise and counterclockwise directions (in FIG. 1) by a first and a second spring around the pinch roller arms.

The reference numeral 13 denotes a shutter operating means for sliding the shutter 1d of the DCC 1 for opening and closing. The shutter operating means 13 includes an arm member 13b whose base end 13a is rotatably fixed to an axis by the holder 10, and a spring 14 which presses the arm member 13b toward the axis in a clockwise direction (in FIG. 1). The shutter operating means 13 is slidably inserted between the first cassette holder 11 and the holder 10, and is biased toward the axis and pressed against the inner surface of the first cassette holder 11 by the spring 14. The shutter operating means 13 is slid to open the shutter 1d with an end portion 13c of the arm member 13b riding on the shutter 1d against the spring 14 and other spring (not shown) provided in the DCC 1 for closing the shutter in accordance with the depth of insertion of the DCC 1. In the illustrated example the spring 14 is brought into engagement with a groove wall 15 of the holder 10 and a projection 13d on the side of the base end of the arm member 13b at one end 14a and at the opposite end 14b, respectively, thereby pressing the arm member 13b in a clockwise direction in FIG. 1.

Figure 3:
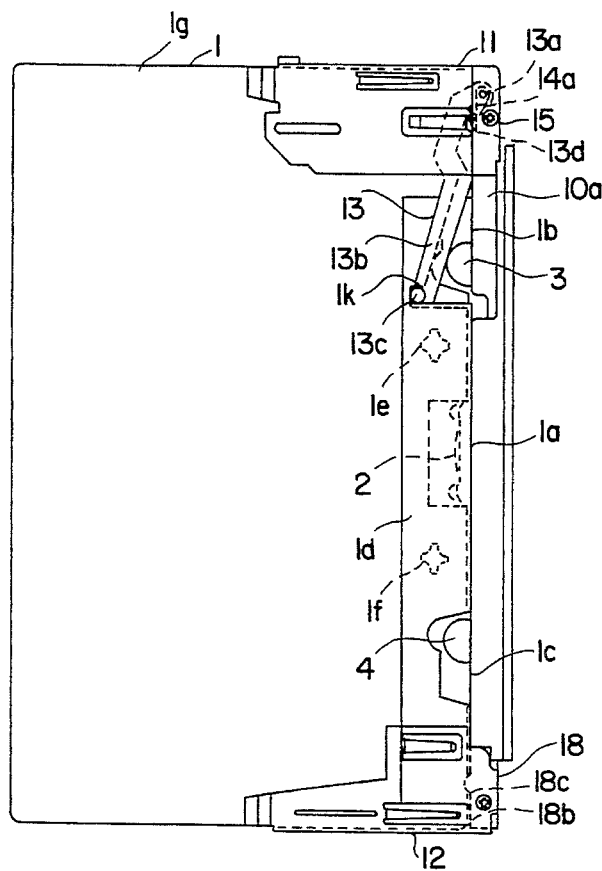
FIG. 3 is a plan view of the main portion after installing the DCC.

The arm member 13b rotates about the base end 13a beyond the position shown in FIG. 3 and up to a further position forward of the front surface of the DCC 1 at the installing position. A housing 10a is provided on the holder 10 to prevent the arm member 13b from abutting against the holder 10, thereby preventing the shutter operating means 13 from being damaged when the DCC 1 is inadvertently inserted inside out, pressed by fingers, or the like.

Figure 4:
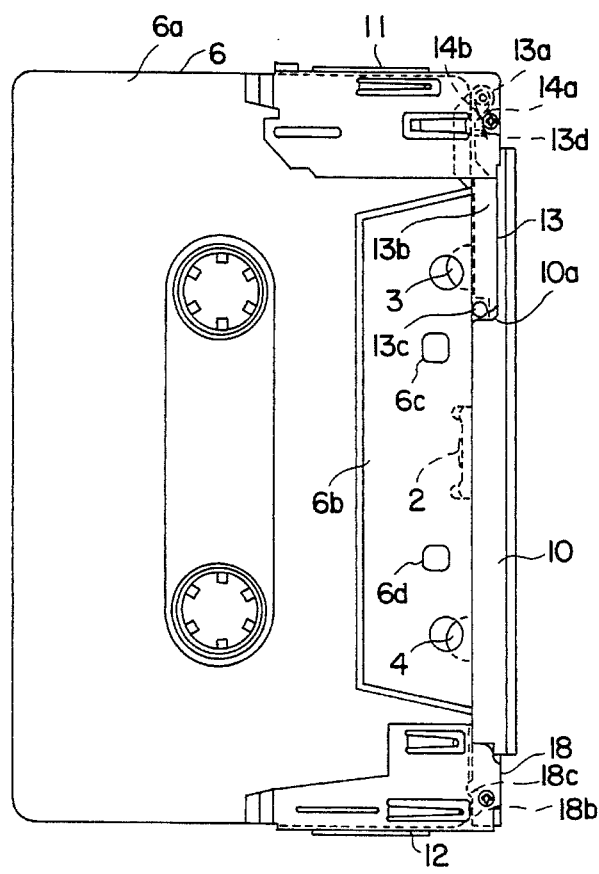
FIG. 4 is a plan view of the main portion of a tape recorder after installing an ACC having at least a thicker portion in the front openings for inserting a magnetic head and the like than that of the DCC.

The arm member 13b has an engager 13e designed to rotate against the spring 14 in accordance with the amount of insertion of the ACC 6 shown in FIG. 4 instead of the DCC 1. The engager 13e comes into engagement with the front surface of the inlet portion 6b so that the arm member 13b can be accommodated in the housing 10a of the holder 10.

Figure 7A:
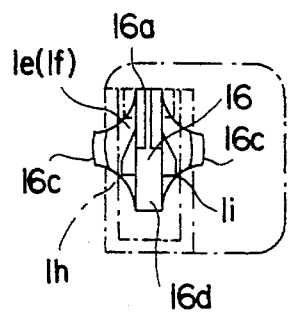
FIG. 7A is a plan view showing a positional relationship between positioning holes in the DCC installing position and the cassette pressing hook.
Figure 7B:
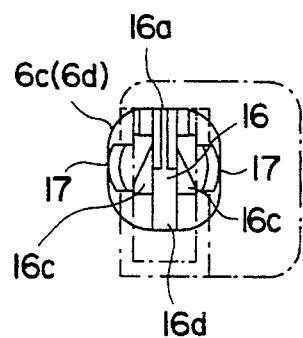
FIG. 7B is a plan view showing a positional relationship between positioning holes in the ACC installing position and the cassette pressing hook.
Figure 7C:
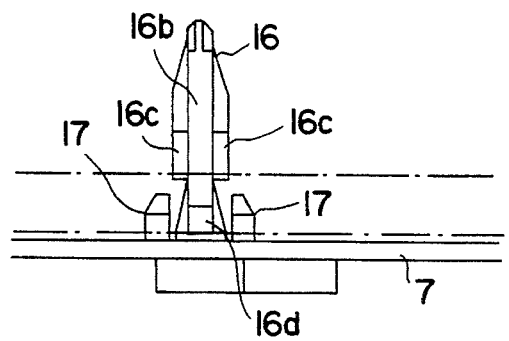
FIG. 7C is a front view showing the situations of FIGS. 7A and 7B, wherein the DCC is shown by the upper two-dot chain line and the ACC is shown by the lower two-dot chain line.

The reference numeral 16 denotes a pair of cassette pressing members for pressing the DCC 1 or the ACC 6 toward the magnetic head. One end 16a of the cassette pressing member 16 is fixed on the lower base plate 7, and the other end 16b is made of an elastic material in a reverse V-shape so as to be displaceable. Furthermore, the cassette pressing member 16 includes a first pressing portion 16c for pressing front curving portions 1h and 1i of the DCC 1 when it is inserted into the first and the second positioning holes 1e and 1f having continuously curved portions. The cassette pressing member 16 also includes a second pressing portion 16d for pressing front portions 1h and 1i of the DCC 1 which is provided with positioning virtually round holes 6c and 6d. The DCC 1 and ACC 6 are positioned in the left-hand and right-hand directions as follows:

The position of the DCC 1 is determined by the back surfaces of the forward curved portions 1h and 1i of the first positioning hole 1e and the end 16a of the cassette pressing member 16. The position of the ACC 6 is determined by both side surfaces of the positioning hole 6c and positioning members 17 projecting on both sides of the cassette pressing member 16. Since the positioning members 17 are so low that they do not interfere with the DCC 1 when it is installed, but act when the ACC 6 is installed as shown in FIG. 7C.

The reference numeral 18 denotes an obstructive member which stops the cassette pressing member 16 from moving the DCC 1 or the ACC 6 toward the magnetic head at predetermined positions and sets the DCC 1 or the ACC 6 to the intended installing position. The DCC 1 is prevented by a first obstructive portion 18a on the upper base plate near the base end 13a of the arm member 13b and a second obstructive portion 18b on the upper base plate located at the position of the second cassette holder 12. The ACC 6 is prevented by the first obstructive portion 18a and a third obstructive portion 18c located next to the second obstructive portion but slightly nearer to the magnetic head 2 instead of the second obstructive portion 18b. The obstructive member 18 on the side of the second cassette holder 12 has the second and third objective portions 18b and 18c, because unless the two portions 18a and 18b are used, the difference in sizes of the rounded portions of the DCC 1 and ACC 6 present the difficulties that the second obstructive portion 18b fails to come into engagement with the ACC 6, and that the shutter 1d comes into engagement with the third objective portion 18c when the shutter is opened.

Figure 6A:
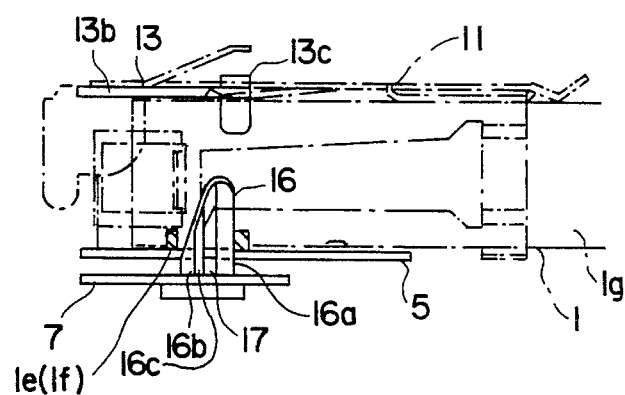
FIG. 6A is a side view showing a positional relationship between the DCC and the hook when the DDC is placed at the installing position.
Figure 6B:
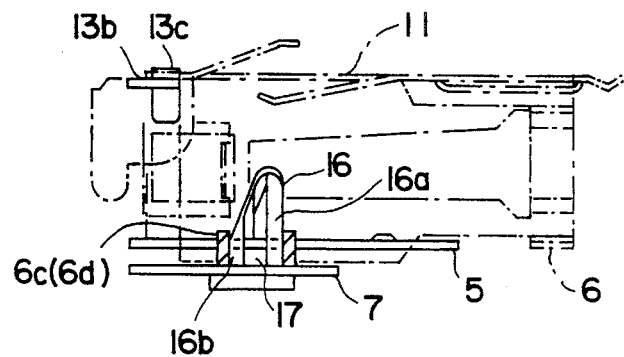
FIG. 6B is a side view showing a positional relationship between an ACC and a cassette pressing hook when the ACC is placed at the installing position.

The operation of the tape recorder according to the present invention will now be described in which a DCC is installed:

As shown in FIG. 1, the end portion 13c of the arm member 13b rides on the guide portion 1j and the shutter 1d. The shutter 1d is slid and opened in accordance with the inserted amount of the DCC 1 against the spring 14 until the end portion 13c comes into engagement with the lock portion 1k as shown in FIG. 3. Even if the DCC is erroneously inserted inside out or the arm member 13b is inadvertently pressed by a finger, the shutter operating means 13 is protected from being damaged because the arm member 13b is accommodated in the housing 10a of the holder 10. The DCC 1 is removed by taking a reverse procedure. When the holder 10 is rotated about the axes 8a and 9a from the conditions shown in FIGS. 3 and 5, the DCC 1 is brought into the position shown in FIG. 6A. In this position, the cassette pressing member 16 is yieldingly inserted into the first and the second positioning holes 1e and 1f. The position of the DCC 1 toward the magnetic head and in the traverse direction is restrained by the first pressing portion 16c, the end 16a, and the first and the second obstructive portions 18a and 18b, thereby fixing the DCC 1 at the installing position.

The operation of the tape recorder when using the ACC 6 is as follows:

The procedure is almost the same as that taken when the DCC 1 is used, except that the arm member 13b is accommodated in the housing 10a of the holder 10 with its engager 13e touching the front surface of the inlet portion 6b of the ACC 6 as shown in FIG. 4. Another difference is that the ACC 6 is positioned by the second pressing portion 16d of the cassette pressing member 16 inserted into the first and the second positioning holes 6c and 6d, the positioning member 17 inserted into the first positioning hole 6c and the first and the third obstructive portions 18a and 18c.

According to the present invention the tape recorder can be applied to both the DCC and the ACC, and the size can be reduced. The position of the shutter operating means 13 is stable because the arm member 13b of the shutter operating means 13 is sandwiched between the first cassette holder 11 and the holder 10, and is pressed against the inner surface of the first cassette holder 11 by the force of the spring 14 toward the axis.

The tape recorder according to the present invention has a holder means capable of reciprocating between the first position where the tape cassette with a shutter is removed and the second position where the magnetic tape is caused to run, the holder means being integrated with the shutter operating means for opening/closing which is constructed with the arm member, thereby ensuring the shutter operating and reducing the size of the tape recorder.

In the tape recorder, the installed tape cassette can rotate beyond the position where the shutter is opened, until it reaches a position forward of the front surface of the tape cassette. Therefore, the shutter operating means is protected from being damaged even when the tape cassette is erroneously inserted.

Since the arm member functioning as the shutter operating means provided with a thicker portion in the opening for allowing the insertion of the magnetic head and the like than that of the DCC is rotated beyond the front surface of the tape cassette, no obstruction acts upon the insertion of them, thereby enabling the tape recorder to be applied to ACCs.

Moreover, the cassette pressing member for pressing the tape cassette toward the magnetic head is provided with the first pressing portion for pressing one side of the positioning hole of the DCC and the second pressing portion for pressing the other side of the positioning hole of the ACC. Therefore, the tape cassette is exactly and firmly positioned in the tape recorder.

As is evident from the foregoing description, the tape recorder of compact size allows the installation of both the DCC and the ACC with accuracy and certainty.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. In a tape recorder for use with analog and digital tape cassettes wherein said digital tape cassette has a shutter over a front portion and said analog tape cassette does not have a shutter, tape holding and tape engaging means comprising:

cassette pressing members for pressing said digital or analog tape cassette toward a magnetic head of said tape recorder, stopping means for said pressing members to fixedly position a front edge of said digital or analog tape cassette against said stopping means and in an exact position relative to said magnetic head when said digital or analog tape cassette is inserted, each of said cassette pressing members having a V-shape elastic part with one end being in a fixed position and another end displaceable relative to said fixed end, first pressing portions for pressing one side of a positioning hole of said digital tape cassette, second pressing portions for pressing one side of a positioning hole of said analog tape cassette, first positioning members for positioning said digital tape cassette when inserted by engagement with the positioning hole of said digital tape cassette; and second positioning members for positioning said analog tape cassette when inserted by engagement with the positioning hole of said analog tape cassette, wherein the first pressing portions do not press the side of the positioning hole of said analog tape cassette, when said analog tape cassette is inserted in said holding means, and the second pressing portions do not press the side of the positioning hole of said digital tape cassette, when said digital tape cassette is inserted in said holding means, and wherein the first positioning members do not engage with the positioning hole of said analog tape cassette, when said analog tape cassette is inserted in said holding means, and the second positioning members do not engage with the positioning hole of said digital tape cassette, when said digital tape cassette is inserted in said holding means.

2. In a tape recorder according to claim 1, wherein said tape holding and engaging means further comprises:

an upper base plate disposed parallel to a lower surface of said digital tape cassette when inserted in the holding means, and a lower base plate disposed parallel to a lower surface of a front portion of said analog tape cassette when inserted in the holding means, said fixed end of said V-shape elastic part of each of the cassette pressing members being fixed on the lower base plate, said first positioning members being disposed on said fixed end of the V-shape elastic part, said second positioning members at opposite lateral sides of each of the pressing members on the lower base plate at a position lower than said lower surface of said digital tape cassette when inserted.

* * * * *